(No Model.) 2 Sheets—Sheet 1.

E. T. BUTLER & T. McFEELY.
MIDDLINGS PURIFIER.

No. 311,808. Patented Feb. 3, 1885.

(No Model.) 2 Sheets—Sheet 2.

E. T. BUTLER & T. McFEELY.
MIDDLINGS PURIFIER.

No. 311,808. Patented Feb. 3, 1885.

Witnesses
James F. Tobin
John E. Parker

Inventors
Eli T. Butler and Thomas McFeely
by their Atty's
Howson & Sons

N. PETERS, Photo-Lithographer, Washington, D. C.

United States Patent Office.

ELI T. BUTLER AND THOMAS McFEELY, OF PHILADELPHIA, PENNSYLVANIA, ASSIGNORS TO SAID McFEELY, SAMUEL E. GRISCOM, AND WALTER GRISCOM, ALL OF SAME PLACE.

MIDDLINGS-PURIFIER.

SPECIFICATION forming part of Letters Patent No. 311,808, dated February 3, 1885.

Application filed April 14, 1884. (No model.)

*To all whom it may concern:*

Be it known that we, ELI T. BUTLER and THOMAS MCFEELY, citizens of the United States, and residents of Philadelphia, Pennsylvania, have invented certain Improvements in Middlings-Purifiers, of which the following is a specification.

Our invention consists of certain improvements in that class of cleaners and separators in which the crushed grain is fed from a primary rotating screen having a graded mesh onto a series of secondary shaking screens, each having a mesh to accord with the grade of material supplied thereto, the objects of our improvements being to dispense with the use of brushes or other cleaners on these secondary screens, and to so regulate the blast as to insure the most effective separation.

Figure 1:
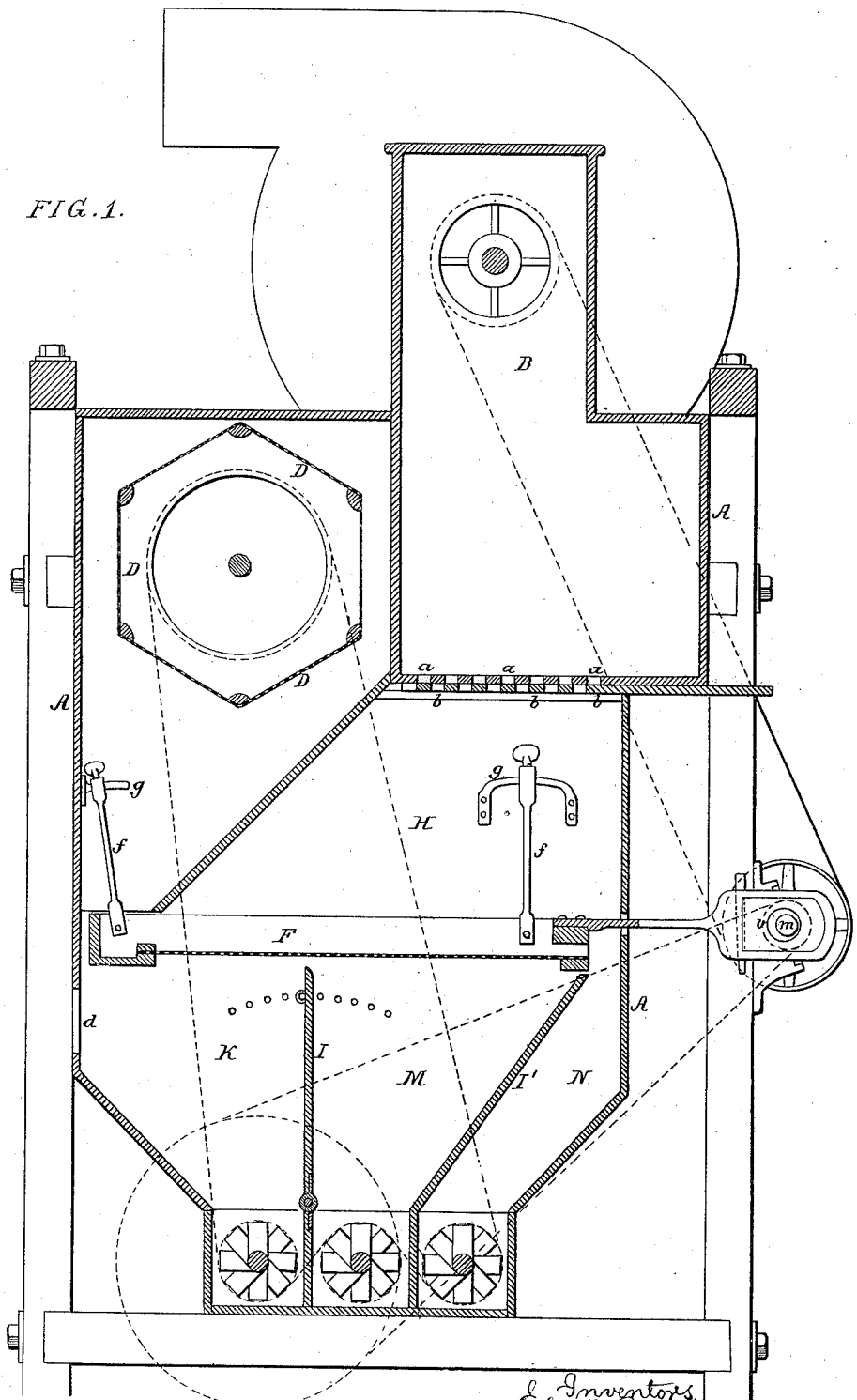
Figure 2:
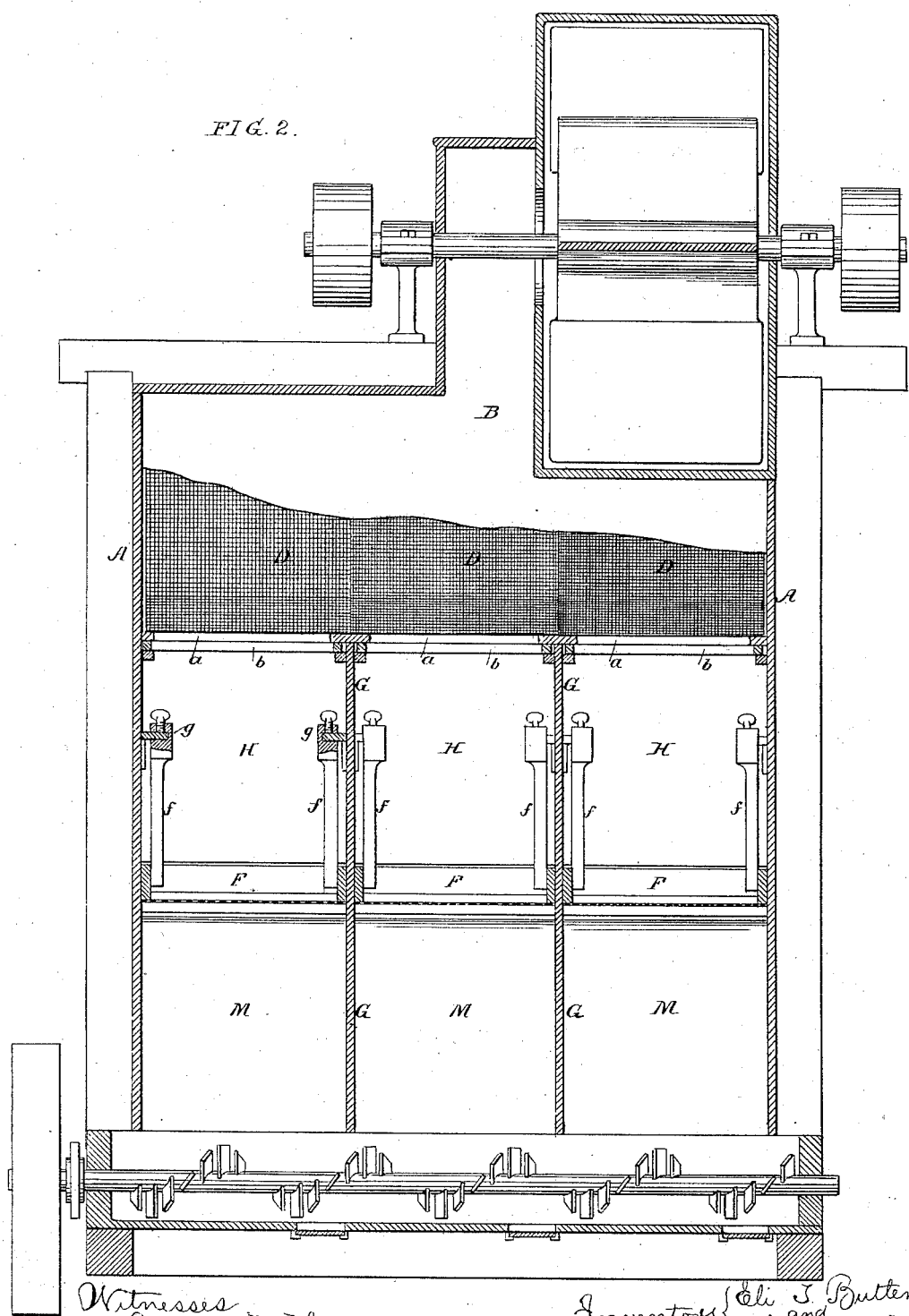

In the accompanying drawings, Figure 1, Sheet 1, is a transverse section of apparatus constructed in accordance with our invention, and Fig. 2, Sheet 2, a longitudinal section of the same.

A is the casing of the apparatus, which has in the upper end a fan-box, B, and bearings for a longitudinal rotary screen, D, of any of the usual constructions, and clothed with gauze of different degrees of fineness, three degrees of mesh being shown in the drawings, for example, although there may be but two grades or more than three grades. In the casing A, beneath the screen D, are three transverse shaking screens, F, one for each gage of gauze on the screen D, and in this portion of the casing are vertical partitions G, which divide it into three independent chambers, H, one for each screen F, and each of these chambers beneath the screen is further subdivided by partitions I I' into three chambers, K, M, and N, each of which has a suitable discharge-spout and conveyer. The fan-box B communicates with each of the chambers H through openings $a$, provided with valves $b$, the valve mechanism of each chamber being independent of that of the others, so that the blast through any one of the screens may be controlled without affecting the blast through either of the others, the air entering openings $d$ in the casing A beneath the screens F. Each screen F is furnished with gauze one grade coarser than that of the section of screen D from which it receives its supply of material. The separation effected by the rotating screen D is a primary separation into different grades, while that effected by the screens F is a secondary separation of each of these grades into different qualities, the cleanest particles passing at once through the screens into the chambers K, other particles not so clean being carried along on the screens and discharged into the chambers M, and still others into the tailing-chamber N, while the light particles and fluff are carried up by the blast into the fan-box B, the strength of blast being regulated by the valves $b$. The providing of the secondary screens with gauze of a grade coarser than that of the section of screen D which supplies the secondary screen, and the maintenance of an upward draft of air through said secondary screens, are the important features of our invention, as the desired separation of the material can be effected without risk of clogging the secondary screen, and without the necessity of using brushes, beaters, or other devices for keeping the screen clean. The separation of the material on the secondary screen by gauze of coarser mesh than that through which the material passed in the primary screen is due to the fact that in the secondary screen the material is simply subjected to a shaking action, and is under the influence of a lifting blast of air, whereas in the primary or rotating screen the material is lifted and allowed to fall, so that it is driven through the meshes of the gauze with which said screen is covered. The receiving end of the chamber K may be contracted and the receiving end of the chamber M correspondingly enlarged by the adjustment of the partition I, separating said chambers, this partition being pivoted for the purpose, and the adjustment being in accord with the character of the material which is being fed onto the screen. The material from the second chamber M may be returned to the rotary screen and again passed through the apparatus, if desired.

It will be observed that owing to the system of partitions G each screen is contained in a separate blast-chamber, so that the force of the blast through each screen may be regulated independently of the others to suit the particular grade of material which is being fed to that screen, the effective and equable action of the blast being thus insured.

It will be observed that, owing to the arrangement of the fan-box B, air-inlets $d$, and partitions I, all the air which passes through the rear portion of each screen F (that is to say, the portion nearest the discharge end) must first pass over the top of the partition beneath said screen. This causes a blast along the bottom of the screen, and serves to separate from the material passing through the head of the screen the lighter particles, which are carried over the partition and deposited in the chamber M, a further purification of the material in the chamber K being thus effected. A forced blast beneath the screens may be substituted for the induced blast, if desired, the same principle of subdivided chambers and independent valves being adopted.

The screens F are hung to elastic arms $f$, the upper ends of which are adjustable on segmental carriers $g$, so that the arcs in which the lower ends of the arms $f$ travel may be varied as the desired shake of the screens may suggest, the shaking movement being effected by eccentrics $i$ on the driving-shaft $m$.

The system of belts whereby the rotating screen, fan, and conveyers are driven is shown by dotted lines in Fig. 1, and will be readily understood without description.

We do not claim, broadly, first grading the material by means of a primary screen, and then feeding each grade onto the head of a secondary shaking screen especially adapted for treating that particular grade, as this has been heretofore proposed; but

We claim as our invention and desire to secure by Letters Patent—

The combination, in a separator, of a primary rotating screen, a series of secondary shaking screens, each receiving a special grade of material from said primary screen, and each having gauze of coarser grade than that of the section of primary screen supplying the material thereto, and means, substantially as described, for producing an upward draft of air through the meshes of the shaking screens, as specified.

In testimony whereof we have signed our names to this specification in the presence of two subscribing witnesses.

ELI T. BUTLER.
THOMAS McFEELY.

Witnesses:
JOHN M. CLAYTON,
HARRY SMITH.